United States Patent
Kai

(10) Patent No.: US 8,104,031 B2
(45) Date of Patent: Jan. 24, 2012

(54) STORAGE SYSTEM, STORAGE UNIT, AND METHOD FOR HOT SWAPPING OF FIRMWARE

(75) Inventor: Hironori Kai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1139 days.

(21) Appl. No.: 11/902,326

(22) Filed: Sep. 20, 2007

(65) Prior Publication Data

US 2008/0184217 A1 Jul. 31, 2008

(30) Foreign Application Priority Data

Jan. 30, 2007 (JP) ................................. 2007-020073

(51) Int. Cl.
 *G06F 9/44* (2006.01)
 *G06F 9/45* (2006.01)
(52) U.S. Cl. .................... 717/168; 717/169; 717/174
(58) Field of Classification Search .......... 717/100–102, 717/122, 168–170, 174–176; 709/203–204
See application file for complete search history.

(56) References Cited

U.S. PATENT DOCUMENTS

| | | | | |
|---|---|---|---|---|
| 5,008,814 A * | 4/1991 | Mathur | ......................... | 709/221 |
| 5,887,131 A * | 3/1999 | Angelo | ............................ | 726/20 |
| 6,360,362 B1 * | 3/2002 | Fichtner et al. | ............... | 717/168 |
| 6,640,334 B1 * | 10/2003 | Rasmussen | .................... | 717/171 |
| 6,971,095 B2 * | 11/2005 | Hirai et al. | ..................... | 717/173 |
| 6,986,032 B2 * | 1/2006 | Qureshi et al. | .................... | 713/1 |
| 7,191,437 B1 * | 3/2007 | Coatney et al. | ............... | 717/174 |
| 7,222,339 B2 * | 5/2007 | Rothman et al. | ............. | 717/168 |
| 7,299,358 B2 * | 11/2007 | Chateau et al. | ............... | 713/176 |
| 7,480,904 B2 * | 1/2009 | Hsu et al. | ....................... | 717/168 |
| 7,506,337 B2 * | 3/2009 | Iyer | ................................ | 717/177 |
| 7,539,868 B2 * | 5/2009 | Balard et al. | .................. | 713/176 |
| 7,546,596 B2 * | 6/2009 | Needham | ....................... | 717/169 |
| 7,681,191 B2 * | 3/2010 | Yuuki | ............................ | 717/170 |
| 7,716,276 B1 * | 5/2010 | Ren et al. | ...................... | 709/203 |
| 7,752,616 B2 * | 7/2010 | Marolia et al. | ................ | 717/169 |

(Continued)

FOREIGN PATENT DOCUMENTS

JP 09-160773 6/1997

(Continued)

OTHER PUBLICATIONS

Alhazbi et al "Multi level mediator based technique for classes hot swapping in Java applications", IEEE, pp. 2889-2892, 2006.*

(Continued)

*Primary Examiner* — Anil Khatri
(74) *Attorney, Agent, or Firm* — Staas & Halsey LLP

(57) ABSTRACT

A storage system includes host apparatuses and a storage unit including a plurality of pieces of firmware corresponding to connection paths to the host apparatuses. The host apparatuses each include status information notification means for sending a notification of normal or abnormal status information of connection paths to the storage unit. The storage unit includes receiving means for receiving, from the host apparatuses, status information notifications corresponding to the connection paths, a management table for storing status information obtained from the received status information notifications, request receiving means for receiving update firmware and a request to perform swapping of firmware, and swapping means for, in a case where the request to perform swapping has been received, when it is determined on the basis of the management table that all the connection paths are normal, sequentially performing hot swapping of the pieces of firmware corresponding to the connection paths.

8 Claims, 14 Drawing Sheets

U.S. PATENT DOCUMENTS

| | | | |
|---|---|---|---|
| 7,770,166 B2 * | 8/2010 | Oh | 717/174 |
| 7,783,731 B2 * | 8/2010 | Van Loo | 709/220 |
| 7,814,480 B2 * | 10/2010 | Sakuda et al. | 717/173 |
| 7,844,945 B2 * | 11/2010 | Bhagia et al. | 717/107 |
| 7,870,548 B2 * | 1/2011 | Chu Chen et al. | 717/168 |
| 7,904,895 B1 * | 3/2011 | Cassapakis et al. | 717/168 |
| 7,991,866 B2 * | 8/2011 | Anderson | 709/223 |
| 2005/0188126 A1 | 8/2005 | Mashima et al. | |
| 2006/0015861 A1 | 1/2006 | Takata et al. | |
| 2006/0092828 A1 | 5/2006 | Aoki et al. | |

FOREIGN PATENT DOCUMENTS

| | | |
|---|---|---|
| JP | 2003-131837 | 5/2003 |
| JP | 2005-242574 | 9/2005 |
| JP | 2006-31312 | 2/2006 |
| JP | 2006-154880 | 6/2006 |

OTHER PUBLICATIONS

Mayama et al, "Design of firmware update system of RT middleware for embedded system", SICE Annual conference, pp. 2818-2822, 2010.*

Kim et al, "Remote progressive firmware update for flash based networked embedded systems", ACM ISLPED, pp. 407-412, 2009.*

Platen et al, "Feedback linking optimizing object code layout for updates", ACM LCTES, pp. 2-11, 2006.*

* cited by examiner

FIG. 3

| SERVER ID | PATH #0 WWN | PATH #0 NORMAL / ABNORMAL | PATH #1 WWN | PATH #1 NORMAL / ABNORMAL |
|---|---|---|---|---|
| | | | | |

FIG. 4

| SERVER | SERVER ID | HOST WWN | STATUS INFORMATION |
|---|---|---|---|
| A | XXXXX | aaaaa | NORMAL |
| | | bbbbb | NORMAL |
| B | YYYYY | ccccc | NORMAL |
| | | ddddd | NORMAL |

FIG. 7

| SERVER | SERVER ID | HOST WWN | STATUS INFORMATION |
|--------|-----------|----------|--------------------|
| A | XXXXX | aaaaa | ABNORMAL ⇒NORMAL |
| | | bbbbb | ABNORMAL ⇒NORMAL |
| B | YYYYY | ccccc | ABNORMAL ⇒NO NOTIFICATION |
| | | ddddd | ERROR ⇒NO NOTIFICATION |

| SERVER | SERVER ID | HOST WWN | STATUS INFORMATION |
|---|---|---|---|
| A | XXXXX | aaaaa | NORMAL |
| | | bbbbb | NORMAL |
| — | — | ccccc | — |
| | | ddddd | — |

| SERVER | SERVER ID | HOST WWN | STATUS INFORMATION |
|---|---|---|---|
| A | XXXXX | aaaaa | NORMAL |
| | | bbbbb | NORMAL |
| — | — | ccccc | NORMAL |
| | | ddddd | NORMAL |

STORAGE SYSTEM, STORAGE UNIT, AND METHOD FOR HOT SWAPPING OF FIRMWARE

BACKGROUND OF THE INVENTION

1. Field of the Invention

The present invention relates to hot swapping of firmware provided in storage units connected to host apparatuses.

2. Description of the Related Art

A redundant array of inexpensive disks (RAID) system includes a server and a RAID unit connected to the server. A plurality of servers can be connected to a RAID unit. In hot swapping of firmware of a RAID unit, when a plurality of control modules (hereinafter described as CMs) that include the firmware exist, the CMs are separated into a first half group and a second half group, and hot swapping is performed separately for the first and second half groups. For example, in the case of a RAID unit that includes four CMs, firmware of two of the CMs is first replaced at the same time. Then, firmware of the other two of the CMs is replaced. A multipath configuration is adopted for the RAID unit and the server, and individual paths are connected to the corresponding CMs. Thus, the firmware can be hot-swapped without stopping the service. The cases of hot swapping of firmware in a RAID unit that includes two CMs will now be described.

FIG. 1A shows a case where known swapping of firmware is normally completed. A server and a RAID unit that includes two connection paths connected to the server are provided.

(1) In a regular operation, data is transferred from the server to the RAID unit using the two paths.

(2) During swapping of firmware of a first half part CM0 of CMs, data is transferred between the server and the RAID unit using only one of the paths on the side of a second half part CM1 of the CMs.

(3) During swapping of firmware of the second half part CM1, data is transferred between the server and the RAID unit using only one of the paths on the side of the first half part CM0, swapping of the firmware of which has been completed.

(4) When swapping of the firmware of the second half part CM1 is completed, data is transferred using the two paths.

FIG. 1B shows a case where the known swapping of firmware is abnormally terminated. In a case where something is wrong with one of the paths, when hot swapping of firmware is performed using the other normal one of the paths, the service is stopped because all the paths between the RAID unit and the server cannot be used as paths for transactions. In this case, at the time swapping of the firmware of the first half part CM0 is started, there is a problem with connectivity of the path connected to the second half part CM1.

(1) A problem occurred with the path connected to the second half part CM1 before swapping of firmware, and thus data is transferred using only the first half part CM0.

(2) When swapping of the firmware of the first half part CM0 is started, data cannot be transferred through the path on the first half part CM0 side.

(3) Since data cannot be transferred through both of the paths, the server detects an error, so that the service is stopped. The same applies to a case where, at the time swapping of the firmware of the second half part CM1 is started, there is a problem with connectivity of the path connected to the first half part CM0.

In a case where the service may be stopped when firmware is hot-swapped, as described above, it is required that swapping of the firmware be not performed at the time, and swapping of the firmware be performed after the cause of the problem with the path is eliminated.

Thus, in the known method, before the firmware of the first half part CM0 is replaced, a maintenance person logs in the server and issues commands to check connectivity of the paths between the RAID unit and the server. When there is no problem, the firmware of the first half part CM0 is replaced. Moreover, before the firmware of the second half part CM1 is replaced, a similar operation is performed.

SUMMARY OF THE INVENTION

It is an object of the present invention to provide a storage system for hot swapping of firmware, in which, in response to a status notification received from a server, hot swapping of firmware is performed.

According to one aspect of the present invention, a storage system includes a host apparatus and a storage unit that includes a plurality of pieces of firmware corresponding to a plurality of connection paths to the host apparatus. The host apparatus includes a status notification unit for sending notification of one of normal status information and abnormal status information of connection paths to the storage unit. The storage unit includes a communication controller for receiving the notification of the status information corresponding to the connection paths sent from the status notification unit, the communication controller receiving update firmware and a request to perform swapping of firmware, a management table for storing status information obtained from the received notification of the status information, and a firmware swapping control unit for sequentially performing hot swapping of the pieces of firmware corresponding to the connection paths upon all the connection paths being in the normal status on the basis of the management table, upon reception of the request to perform swapping of firmware.

BRIEF DESCRIPTION OF THE DRAWINGS

FIG. 3 shows status notification information;

FIG. 4 shows a management table in the first embodiment;

FIG. 7 shows a management table in a second embodiment;

DESCRIPTION OF THE PREFERRED EMBODIMENTS

First Embodiment

Figure 1A:
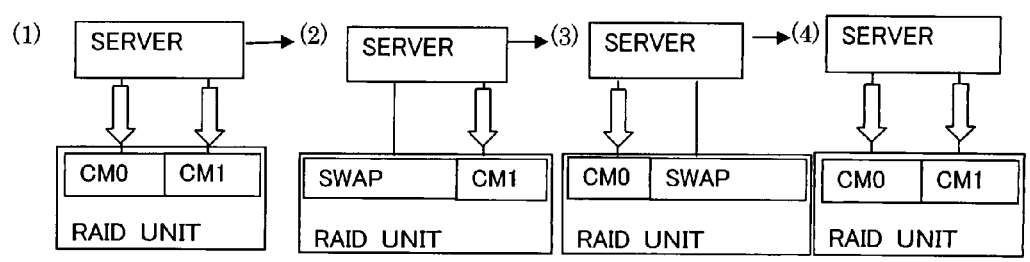
FIGS. 1A and 1B show known hot swapping of firmware.
Figure 1B:
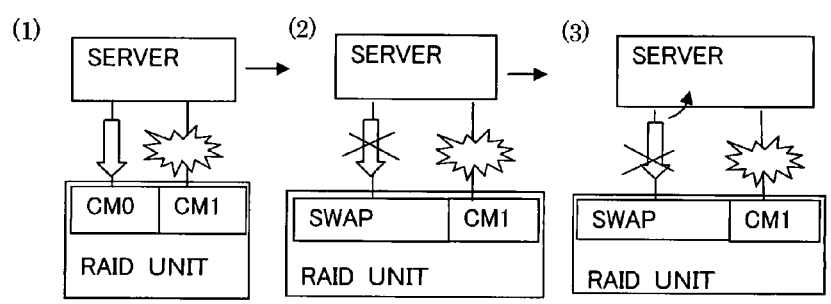
Figure 2:
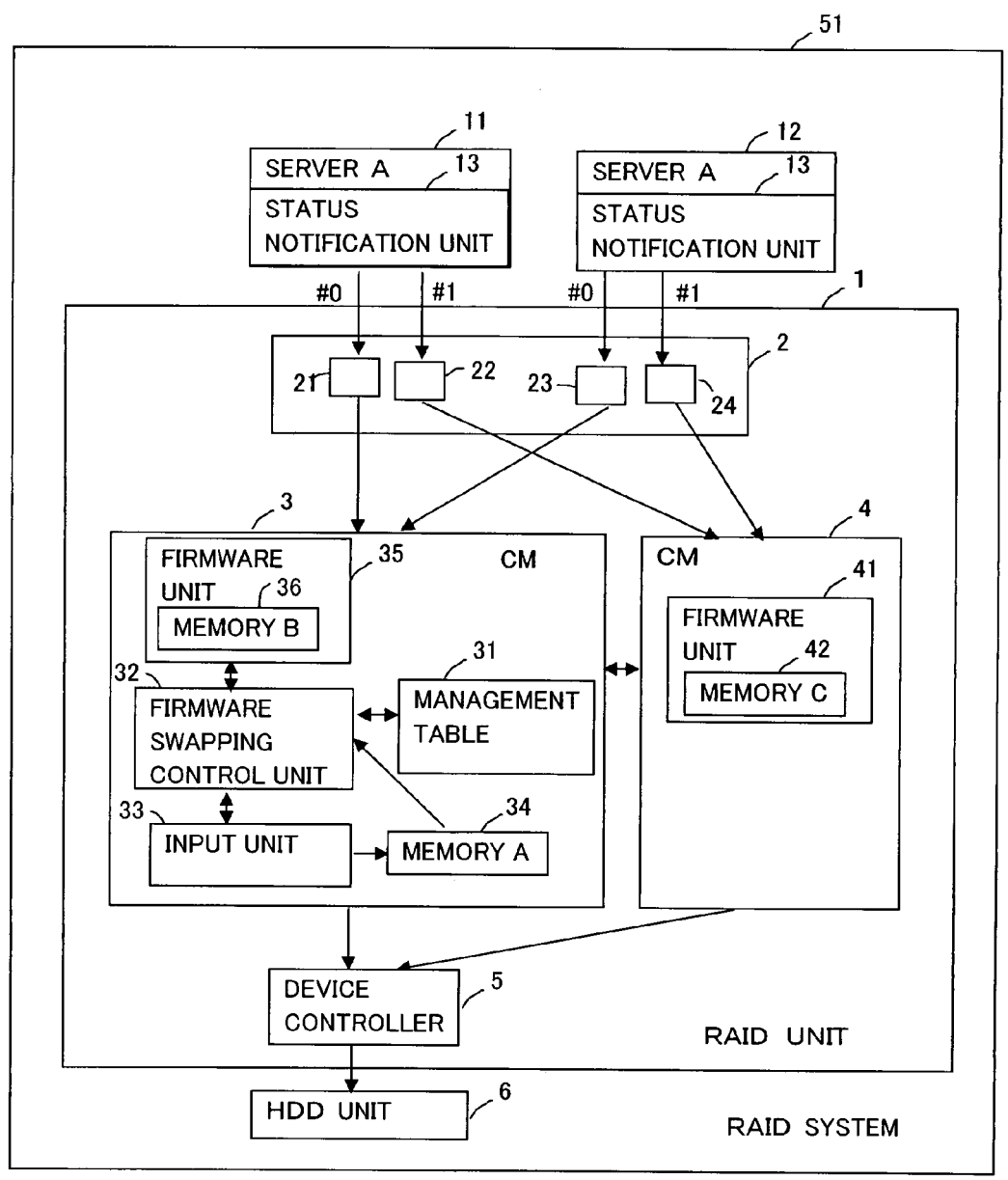
FIG. 2 is a block diagram of a RAID system according to a first embodiment.

FIG. 2 is a block diagram of a RAID system according to a first embodiment. The RAID system 51 includes, for example, a server (A) 11, a server (B) 12, and a RAID unit 1.

In this case, the server (A) 11 and the server (B) 12 each include two connection paths and a status notification unit 13.

The status notification unit 13 sends a notification of a normal or abnormal status of connection between the RAID unit 1 and each of the server (A) 11 and the server (B) 12 to the RAID unit 1 by a status notification command. In the case of a problem, a notification is sent using a normal path out of multiple paths.

FIG. 3 shows status notification information. Status information includes a sever identification (ID), a world wide name (WWN) that is the identification number of a port of a host bus adaptor (HBA), and a normal or abnormal status of a path. In this case, the status notification information includes the WWNs of connection paths 0 and 1 and a normal or abnormal status of the connection paths 0 and 1. A status notification command is sent when the status changes. When a power supply is turned on, a notification of a normal or abnormal status of connection between the RAID unit 1 and each of the server (A) 11 and the server (B) 12 is sent as initial values. Moreover, when a problem has occurred with connection to the RAID unit 1 or when a problem with connection to the RAID unit 1 has been fixed, a notification is sent to the RAID unit 1.

Returning to the description of FIG. 2, the RAID unit 1 includes a communication controller 2, control modules (CMs) 3 and 4, a device controller 5, and a hard disk drive (HDD) unit 6.

The communication controller 2 controls communications with the server (A) 11 and the server (B) 12. Moreover, the communication controller 2 connects the server (A) 11 and the server (B) 12 to the CM 3 and the CM 4 with the connection paths 0 and 1. To this end, the communication controller 2 includes four communication control units 21 to 24. When the communication controller 2 has received a status notification command, the communication controller 2 transfers the status notification command to a firmware swapping control unit 32 in the CM 3. Moreover, when other commands for transactions, for example, read and write commands, have been received, the other commands are transferred to a firmware unit 35 in the CM 3 or a firmware unit 41 in the CM 4 in a manner that depends on a corresponding connection path.

The CM 3 includes a management table 31, the firmware swapping control unit 32, an input unit 33, a storage unit (A) 34, and the firmware unit 35. In a configuration in which the CM 3 includes the management table 31, the firmware swapping control unit 32, the input unit 33, and the storage unit (A) 34 necessary to replace firmware, swapping of firmware of both the CM 3 and the CM 4 is controlled. Alternatively, the CM 3 and the CM 4 may each include the management table 31, the firmware swapping control unit 32, the input unit 33, and the storage unit (A) 34. The CM 3 corresponds to the connection paths 0 (hereinafter called CM 3 paths).

The CM 4 includes the firmware unit 41 and corresponds to the connection paths 1 (hereinafter called CM 4 paths).

Status notification information from the server (A) 11 and the server (B) 12 is registered in the management table 31.

FIG. 4 shows a management table in the first embodiment. For individual server IDs corresponding to the server (A) 11 and the server (B) 12, the management table 31 stores host WWNs and the status information of the CM 3 paths corresponding to WWNs aaaaa and ccccc and the CM 4 paths corresponding to WWNs bbbbb and ddddd. FIG. 4 shows a case where all initial values are normal. A distinction can be made between the server (A) 11 and the server (B) 12 on the basis of the server IDs included in the status information.

Moreover, a distinction can be made between the CM 3 paths and the CM 4 paths on the basis of the host WWNs included in the status information.

Returning to the description of FIG. 2, the firmware swapping control unit 32 receives status notification commands from the server (A) 11 and the server (B) 12, connection to which is established. The firmware swapping control unit 32 further updates the management table 31 upon receiving status notification commands from the server (A) 11 and the server (B) 12.

In a case where the firmware swapping control unit 32 has accepted a request to start swapping of firmware, when the firmware swapping control unit 32 determines with reference to the management table 31 that the status of the server (A) 11 and the server (B) 12 is not abnormal, the firmware swapping control unit 32 performs swapping of firmware. In a process of swapping of firmware, update firmware is first obtained from the storage unit (A) 34 and loaded into a storage unit (B) 36 in the CM 3 subjected to swapping. When the firmware unit 35 has restarted communications after swapping of firmware in the CM 3 is completed, swapping of firmware in the CM 4 is started by loading the update firmware into a storage unit (C) 42 in the firmware unit 41 of the CM 4.

On the other hand, in a case where the firmware swapping control unit 32 has accepted a request to start swapping of firmware, when the firmware swapping control unit 32 determines with reference to the management table 31 that the status of any one of the connection paths to the server (A) 11 and the server (B) 12 is abnormal, the firmware swapping control unit 32 stops swapping of firmware. Then, the firmware swapping control unit 32 waits for a while for the server (A) 11 and the server (B) 12 to recover from the problem, and then again determines with reference to the management table 31 whether firmware can be replaced.

Other than information in the management table 31, the status of the inside of the RAID unit 1 may be added as a criterion for determining whether to perform swapping of firmware, for example, a status in which a problem with the communication controller 2 is detected. In this case, both a problem with the connection paths between the RAID unit 1 and each of the server (A) 11 and the server (B) 12 and a problem with the inside of the RAID unit 1 can be checked.

The input unit 33 accepts a request to start swapping of firmware and a request to upload update firmware to the RAID unit 1 from a maintenance person. Then, the update firmware is stored in the storage unit (A) 34.

The firmware units 35 and 41 include firmware for controlling data between the RAID unit 1 and each of the server (A) 11 and the server (B) 12. When a write command is received from the server (A) 11 or the server (B) 12, data is stored in the HDD unit 6. When a read command is received from the server (A) 11 or the server (B) 12, data is read from the HDD unit 6 and transferred to the server (A) 11 or the server (B) 12. Moreover, the firmware units 35 and 41 include the storage unit (B) 36 and the storage unit (C) 42, which store the firmware to be executed, respectively.

The device controller 5 controls the HDD unit 6 to read and write data.

The HDD unit 6 includes a plurality of HDDs that store data.

The operation of the RAID system 51 will now be described. An overview of the operation will first be described. In the RAID system 51, after connectivity of the connection paths between the RAID unit 1 and each of the server (A) 11 and the server (B) 12 is ensured, swapping of firmware is performed without an operation in the server (A) 11 and the server (B) 12. The server (A) 11 and the server (B)

12 monitor connectivity with the RAID unit 1 and issue status notification commands that indicate the status of the server (A) 11 and the server (B) 12 to the RAID unit 1 when connection to the RAID unit 1 has been started, when a problem has occurred, or when a problem has been fixed. The RAID unit 1 includes a plurality of the connections paths to the server (A) 11 and the server (B) 12 connected to the RAID unit 1. The RAID unit 1 registers status information received from the server (A) 11 and the server (B) 12 connected to the RAID unit 1 in the management table 31 for each of the server (A) 11 and the server (B) 12 and for each path.

Then, in a case where a request to start swapping of firmware input to the RAID unit 1 by a maintenance person is accepted, when it is determined with reference to the management table 31 that the status of the server (A) 11 and the server (B) 12 is not abnormal, swapping of the firmware of the CM 3 is performed. At this time, transactions can be processed using the connection paths to the CM 4. When hot swapping of the firmware of the CM 3 is completed, swapping of the firmware of the CM 4 is performed. At this time, transactions can be processed using the connection paths to the CM 3.

On the other hand, in a case where a request to start swapping of firmware is accepted, when it is determined with reference to the management table 31 that the status of any one of the server (A) 11 and the server (B) 12 is abnormal, swapping of firmware is stopped. Then, the RAID unit 1 waits for a normal status of connection to the server (A) 11 and the server (B) 12 to be restored, and when the normal status has been restored, the RAID unit 1 performs swapping of firmware.

Figure 5:
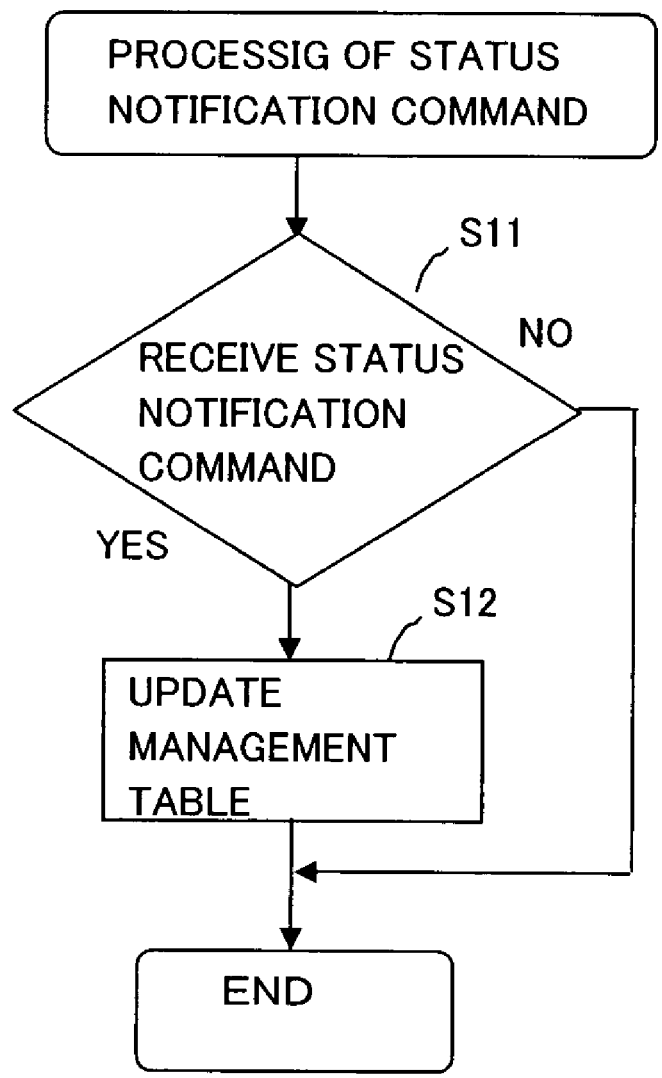
FIG. 5 is a flowchart showing the processing, according to the first embodiment, of a status notification command.

FIG. 5 is a flowchart showing the processing, according to the first embodiment, of a status notification command. In step S11, it is determined whether a status notification command has been received. When a command received from the server (A) 11 or the server (B) 12 is a status notification command, in step S12, the management table 31 is updated, and then the process is completed. When a command received from the server (A) 11 or the server (B) 12 is not a status notification command, the process is completed.

Figure 6:
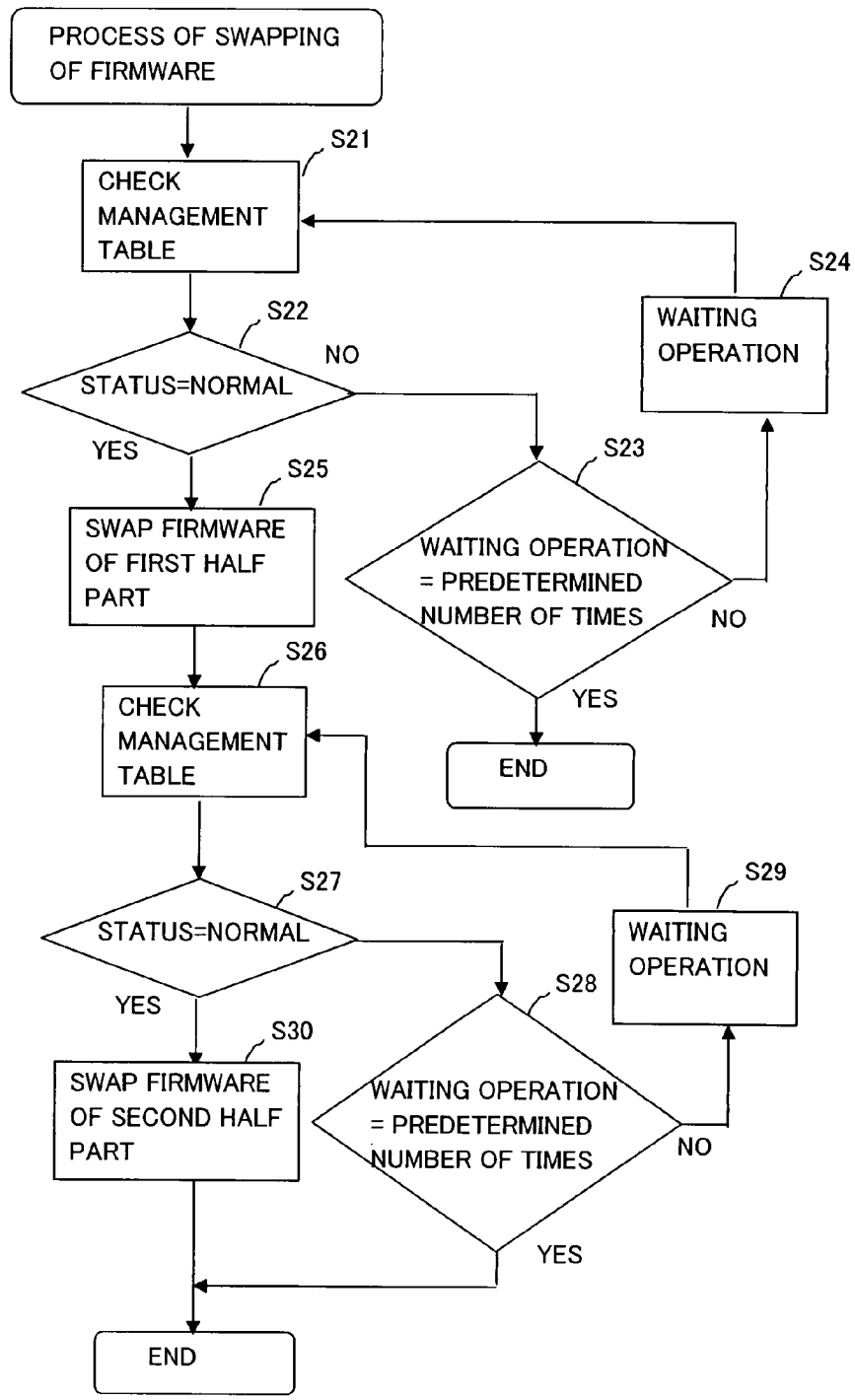
FIG. 6 is a flowchart showing a process, according to the first embodiment, of swapping of firmware.

FIG. 6 is a flowchart showing a process, according to the first embodiment, of swapping of firmware. In step S21, the management table 31 is checked when a request to start swapping of firmware has been received. Then, in step S22, it is determined whether the status of all the connections paths to the server (A) 11 and the server (B) 12 is normal.

When the status of any one of the connection paths is abnormal, in step S23, it is determined whether a waiting operation has been performed a predetermined number of times. When a waiting operation has been performed the predetermined number of times, swapping of firmware is not performed, and the process is completed. When a waiting operation has not been performed the predetermined number of times, in step S24, a waiting operation is performed for predetermined time. After the waiting operation, the process returns to step S21.

On the other hand, when the status of all the connections paths to the server (A) 11 and the server (B) 12 is normal, in step S25, swapping of firmware of a first half part is performed. When swapping of the firmware of the first half part is completed, in step S26, the management table 31 is checked. Then, in step S27, it is determined whether the status of all the connections paths to the server (A) 11 and the server (B) 12 is normal.

When the status of any one of the connection paths is abnormal, in step S28, it is determined whether a waiting operation has been performed the predetermined number of times. When a waiting operation has been performed the predetermined number of times, swapping of firmware is not performed, and the process is completed. When a waiting operation has not been performed the predetermined number of times, in step S29, a waiting operation is performed for the predetermined time. After the waiting operation, the process returns to step S26.

On the other hand, when the status of all the connections paths to the server (A) 11 and the server (B) 12 is normal, in step S30, swapping of firmware of a second half part is performed. When swapping of the firmware of the second half part is completed, the process is completed.

Second Embodiment

The difference between the first embodiment and a second embodiment will now be described. Even in a case where, although status information has already been registered in the management table 31, the status of the server (A) 11 or the server (B) 12 is abnormal because, for example, the power supply is turned off, swapping of firmware needs to be performed without a problem. Thus, swapping of firmware is started in the following manner. Specifically, a system is provided, in which both the server (A) 11 and the server (B) 12 periodically send status notification commands to the RAID unit 1. After the RAID unit 1 receives an instruction to start swapping of firmware, the RAID unit 1 waits for responses from all the servers registered in the management table 31. Then, the RAID unit 1 checks whether the RAID unit 1 has received status information from all the servers registered in the management table 31, and starts swapping of firmware when the status of all the connection paths to the server (A) 11 and the server (B) 12 is normal. Having registered the connection paths as being normal in the management table 31 means that programs that support a status information notification function are running in the servers. In this case, when no problem exists with connectivity, status notifications are periodically sent. Thus, when any information has not been sent from all the paths to one of the server (A) 11 and the server (B) 12 after predetermined time has elapsed, notifications cannot be sent because the power supply of the one of the server (A) 11 and the server (B) 12 may be off, or problems exist with all cables of the one of the server (A) 11 and the server (B) 12. Accordingly, assuming that the one of the server (A) 11 and the server (B) 12 is not temporarily supported by the status information notification function, swapping of firmware can be started.

FIG. 7 shows a management table in the second embodiment. In the initial status, the status of the CM 3 path and the CM 4 path to the server (A) 11 and the CM 3 path and the CM 4 path to the server (B) 12 is set to a normal status by status notification commands that are periodically sent from the server (A) 11 and the server (B) 12. When an instruction to start swapping of firmware has been received, the status of all the paths is changed to an abnormal status. In this case, the server (A) 11 sends status information, so that the status of the CM 3 path and the CM 4 path to the server (A) 11 is changed to a normal status. Subsequently, when the server (B) 12 is placed in a status in which the server (B) 12 cannot connect to the RAID unit 1 because, for example, the power supply is turned off, no notification is sent from the server (B) 12. Thus, the firmware swapping control unit 32 includes a timer function for monitoring status notification commands periodically sent from the server (A) 11 and the server (B) 12. In a case where any status notification command has not been received when a timeout has occurred, the management table 31 is updated so that the status of the CM 3 path and the CM 4 path to the server (B) 12 is set to a status (hereinafter referred to as a no-notification status) indicating that any notification has not been received. Then, when the status information is checked, the process is performed assuming that a no-notification status is not an abnormal status. Thus, even when connection to the server (B) 12 is disconnected because, for example, the power supply is turned off, swapping of firmware can be performed.

Figure 8:
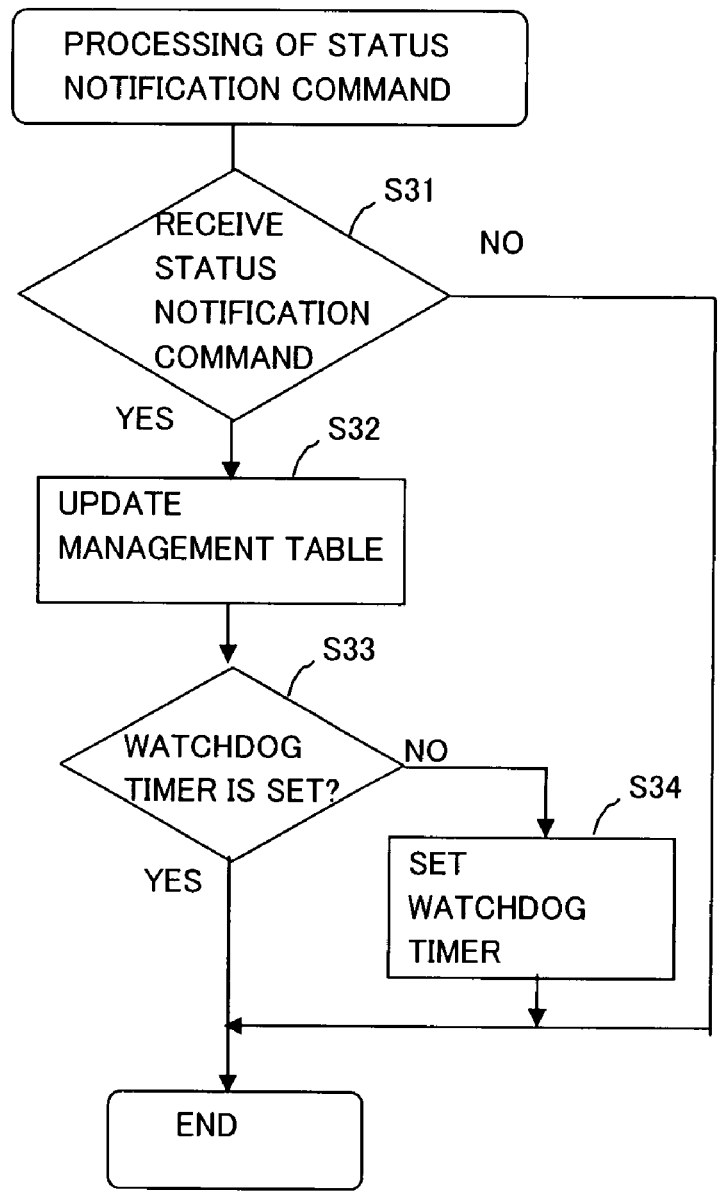
FIG. 8 is a flowchart showing the processing, according to the second embodiment, of a status notification command.

FIG. 8 is a flowchart showing the processing, according to the second embodiment, of a status notification command. In step S31, it is determined whether a status notification command has been received. When a status notification command has not been received, the process is completed. When a command received from the server (A) 11 or the server (B) 12 is a status notification command, in step S32, the management table 31 is updated. Then, in step S33, it is determined whether a watchdog timer has been set. When the watchdog timer has not been set, in step S34, the watchdog timer is set. When the watchdog timer has been set, the process is completed.

Figure 9:
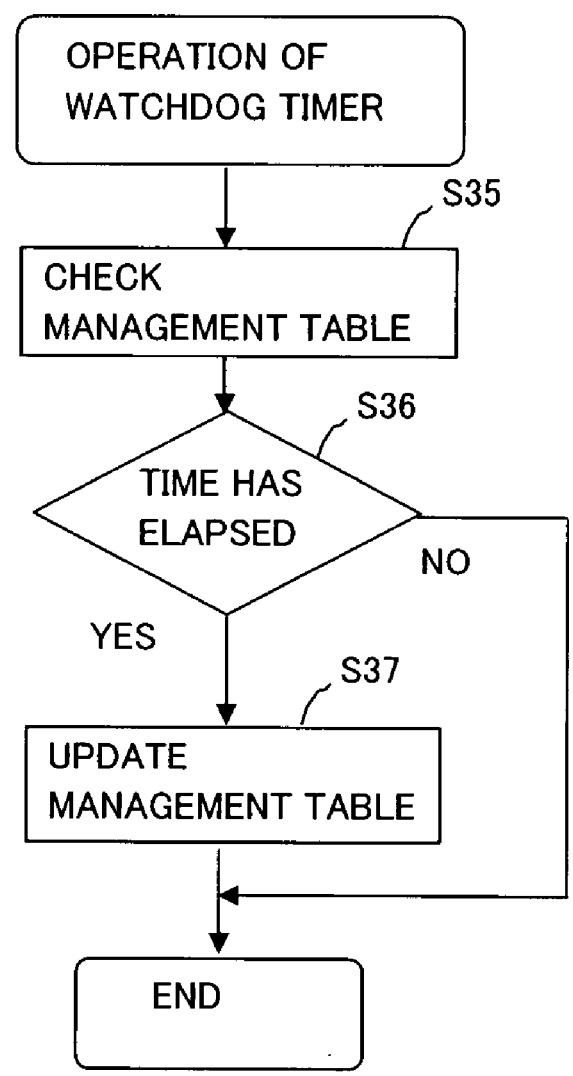
FIG. 9 is a flowchart showing the operation, according to the second embodiment, of a watchdog timer.

FIG. 9 is a flowchart showing the operation, according to the second embodiment, of a watchdog timer. The watch dog refers to the management table 31 in step S35 and checks in step S36 whether any path exists, the status information of the path having not been updated when predetermined time has elapsed since the status information was received last time. When the status information of all the paths to one of the server (A) 11 and the server (B) 12 has not been updated when the predetermined time has elapsed, in step S37, the management table 31 is updated so that the status of the one of the server (A) 11 and the server (B) 12 is set to a no-notification status. Then, the process is completed.

Figure 10:
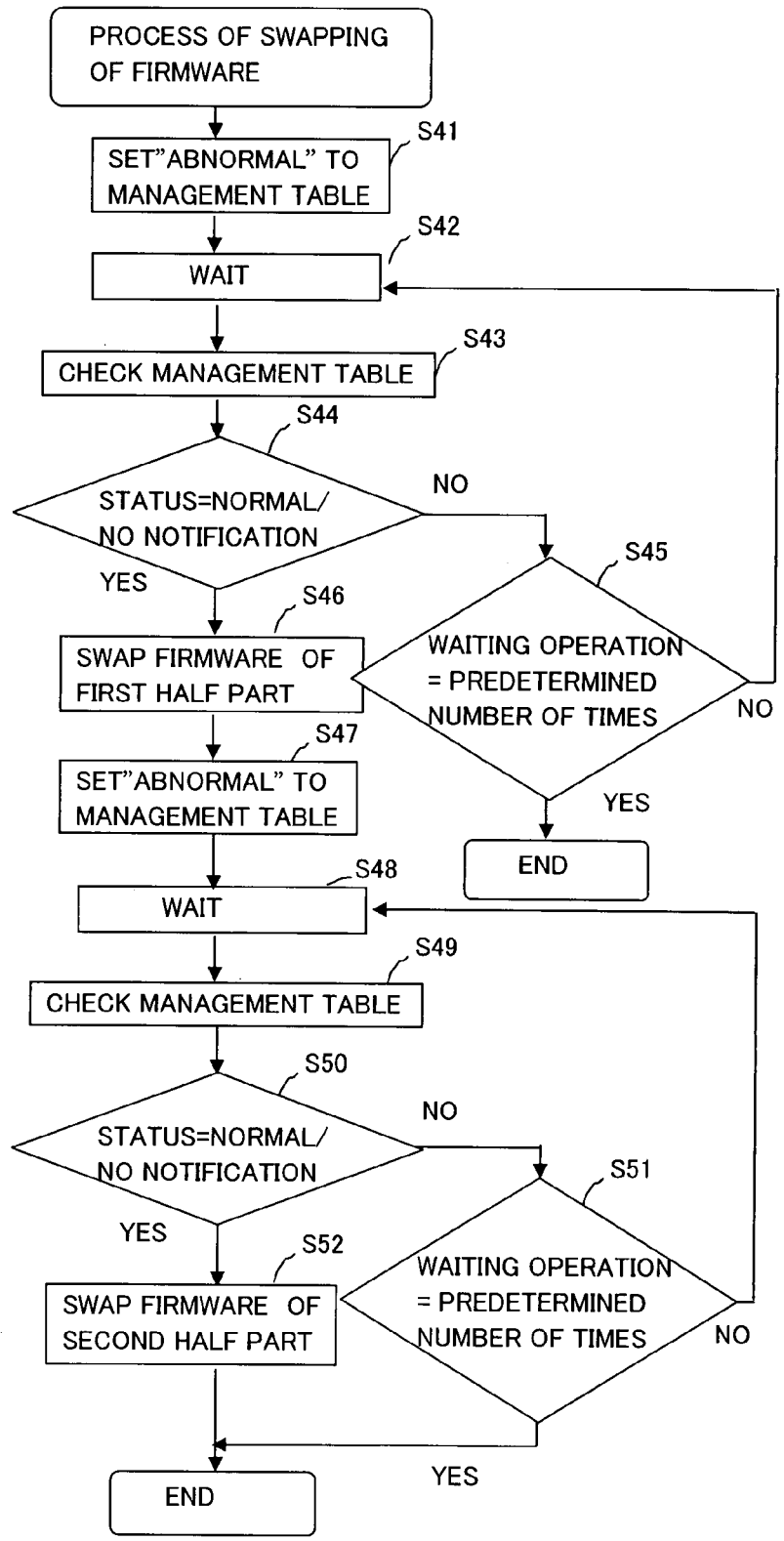
FIG. 10 is a flowchart showing a process, according to the second embodiment, of swapping of firmware.

FIG. 10 is a flowchart showing a process, according to the second embodiment, of swapping of firmware. When a request to start swapping of firmware is received, in step S41, the status of all the paths registered in the management table 31 is first set to an abnormal status. Then, in step S42, notifications of status information from the individual servers are waited for for predetermined time. When the predetermined time has elapsed, the management table 31 is referred to in step S43, and it is checked in step S44 whether the status of all the paths to the server (A) 11 and the server (B) 12 is a normal status or a no-notification status.

When the status of any one of the connection paths is abnormal, in step S45, it is determined whether a waiting operation has been performed a predetermined number of times. When a waiting operation has been performed the predetermined number of times, swapping of firmware is not performed, and the process is completed. When a waiting operation has not been performed the predetermined number of times, the process returns to step S42.

On the other hand, when the status of all the paths to the server (A) 11 and the server (B) 12 is a normal status or a no-notification status, in step S46, swapping of the firmware of the first half part is performed. When swapping of the firmware of the first half part is completed, in step S47, the status of all the paths registered in the management table 31 is set to an abnormal status. Then, in step S48, notifications of status information from the individual servers are waited for for the predetermined time. Then, in step S49, the management table 31 is checked. Then, in step S50, it is checked whether the status of all the paths to the server (A) 11 and the server (B) 12 is a normal status or a no-notification status.

When the status of any one of the connection paths is abnormal, in step S51, it is determined whether a waiting operation has been performed the predetermined number of times. When a waiting operation has been performed the predetermined number of times, swapping of firmware is not performed, and the process is completed. When a waiting operation has not been performed the predetermined number of times, the process returns to step S48.

On the other hand, when the status of all the paths to the server (A) 11 and the server (B) 12 is a normal status or a no-notification status, in step S52, swapping of the firmware of the second half part is performed. When swapping of the firmware of the second half part is completed, the process is completed.

Third Embodiment

Even when a server exists, in which a program that supports the status information notification function is not installed, swapping of firmware can be performed for such a server after checking the connectivity. For example, for a server the status information of which is not registered in the management table 31, i.e., a server that does not support the status information notification function, after an instruction to start swapping of firmware is received, sense information is set in the communication controller 2. Then, when the firmware swapping control unit 32 has detected that the server has accessed the sense information, it is determined that there is no problem with connectivity even with the server. Thus, the firmware can be replaced.

Figure 11:
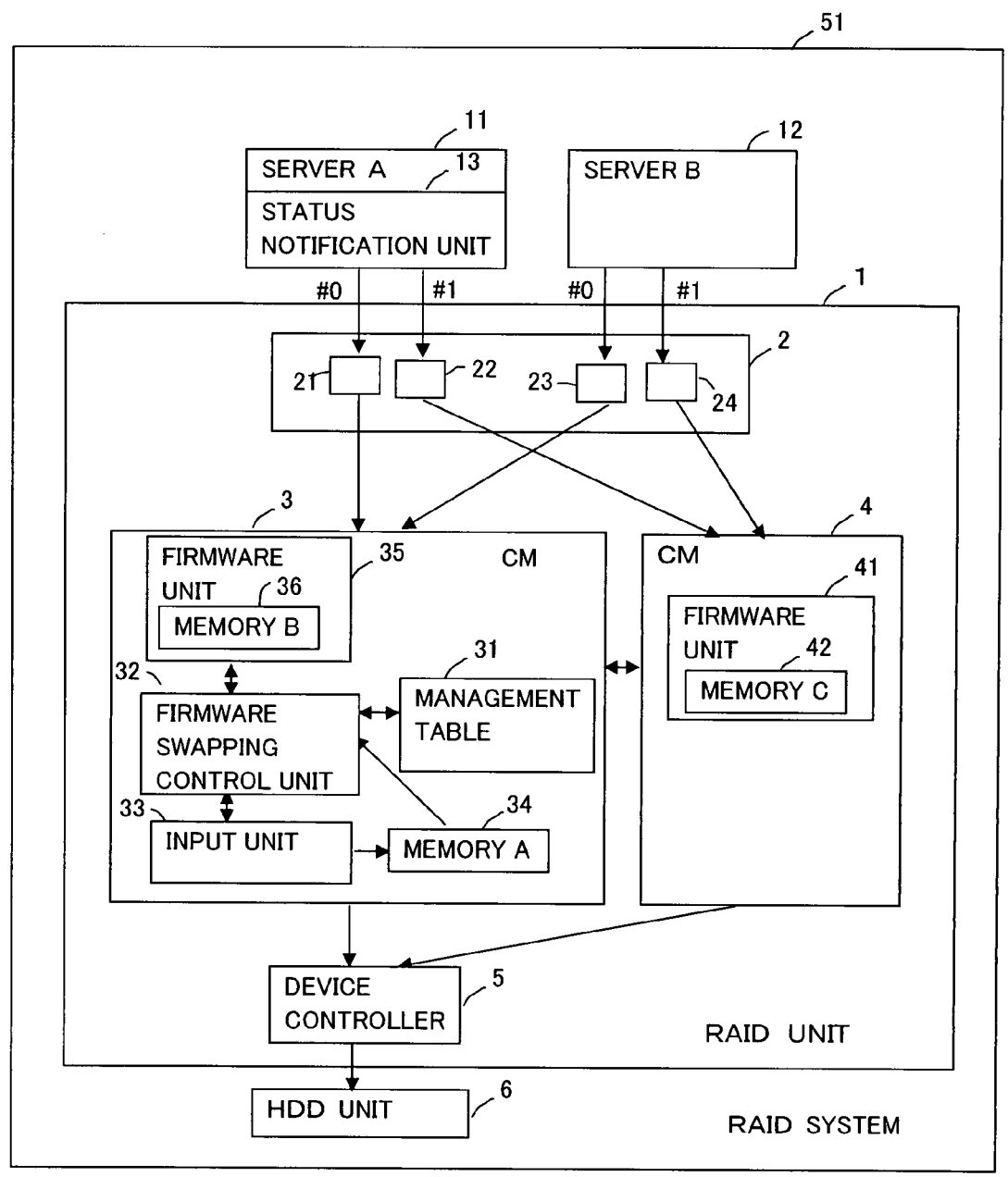
FIG. 11 is a block diagram of a RAID system according to a third embodiment.

FIG. 11 is a block diagram of a RAID system according to a third embodiment. The block diagram of the RAID system according to the third embodiment is different from that according to the first embodiment in that the server (B) 12 does not include the status notification unit 13. The other components in the third embodiment are the same as those in the first embodiment.

Figures 12A, 12B:
FIGS. 12A and 12B show a management table in the third embodiment.

FIGS. 12A and 12B show a management table in the third embodiment. Since the server (A) 11 includes the status notification unit 13 and the server (B) 12 does not include the status notification unit 13, in the initial status, the status information of host WWNs in the server (A) 11 is set, and the status information of host WWNs in the server (B) 12 is not set, as shown in the management table 31 in FIG. 12A. In this status, since the status of all the connection paths to the server (A) 11 and the server (B) 12 is not normal, firmware cannot be replaced. Thus, the firmware swapping control unit 32 includes a function of setting sense information and a function of detecting access to sense information. In this arrangement, when the server (B) 12 has accessed the sense information, it is determined that the connection status is normal. Then, when it is determined that the connection status is normal, the management table 31 is updated so that the status of the corresponding WWNs is set to a normal status, as shown in FIG. 12B. The operations of the function of setting sense information and the function of detecting access to sense information are as follows: When the firmware swapping control unit 32 sets predetermined sense information in a sense information table for the firmware units 35 and 41, the sense information is set to a pending status. Then, the firmware swapping control unit 32 monitors cancellation of the pending status due to access by a sense command from the server (B) 12. When the pending status has been cancelled, the corresponding status is set to a normal status in the management table 31.

Figure 13:
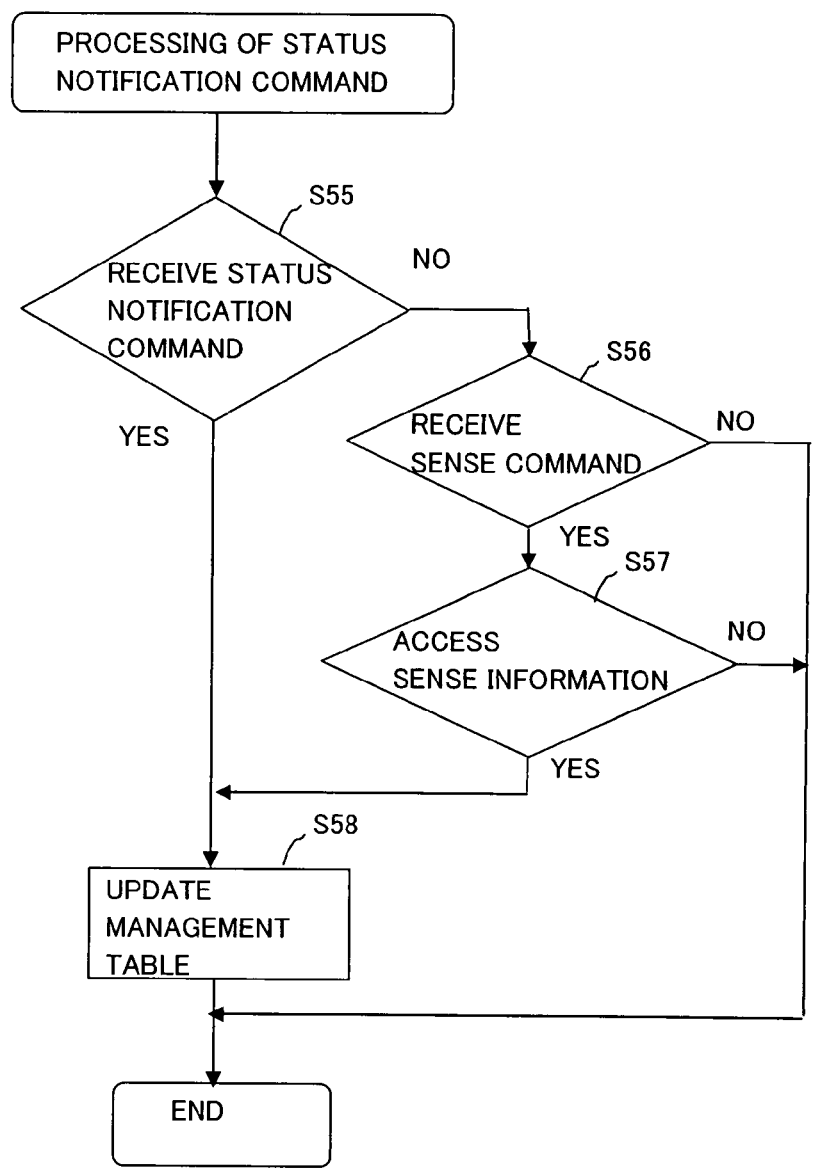
FIG. 13 is a flowchart showing the processing, according to the third embodiment, of a status notification command.

FIG. 13 is a flowchart showing the processing, according to the third embodiment, of a status notification command. Steps of checking a sense command are added to the flowchart of the processing, according to the first embodiment, of a status notification command. In step S55, it is determined whether a status notification command has been received.

When a command received from the server (A) 11 or the server (B) 12 is not a status notification command, in step S56, it is checked whether the received command is a sense command.

When the received command is a sense command, in step S57, it is checked whether set sense information has been accessed. Otherwise, the process is completed.

When the sense information has been accessed, in step S58, the management table 31 is updated so that the corresponding status is set to a normal status. Otherwise, the process is completed.

On the other hand, when a command received from the server (A) 11 or the server (B) 12 is a status notification command, in step S58, the management table 31 is updated, and then the process is completed.

Figure 14:
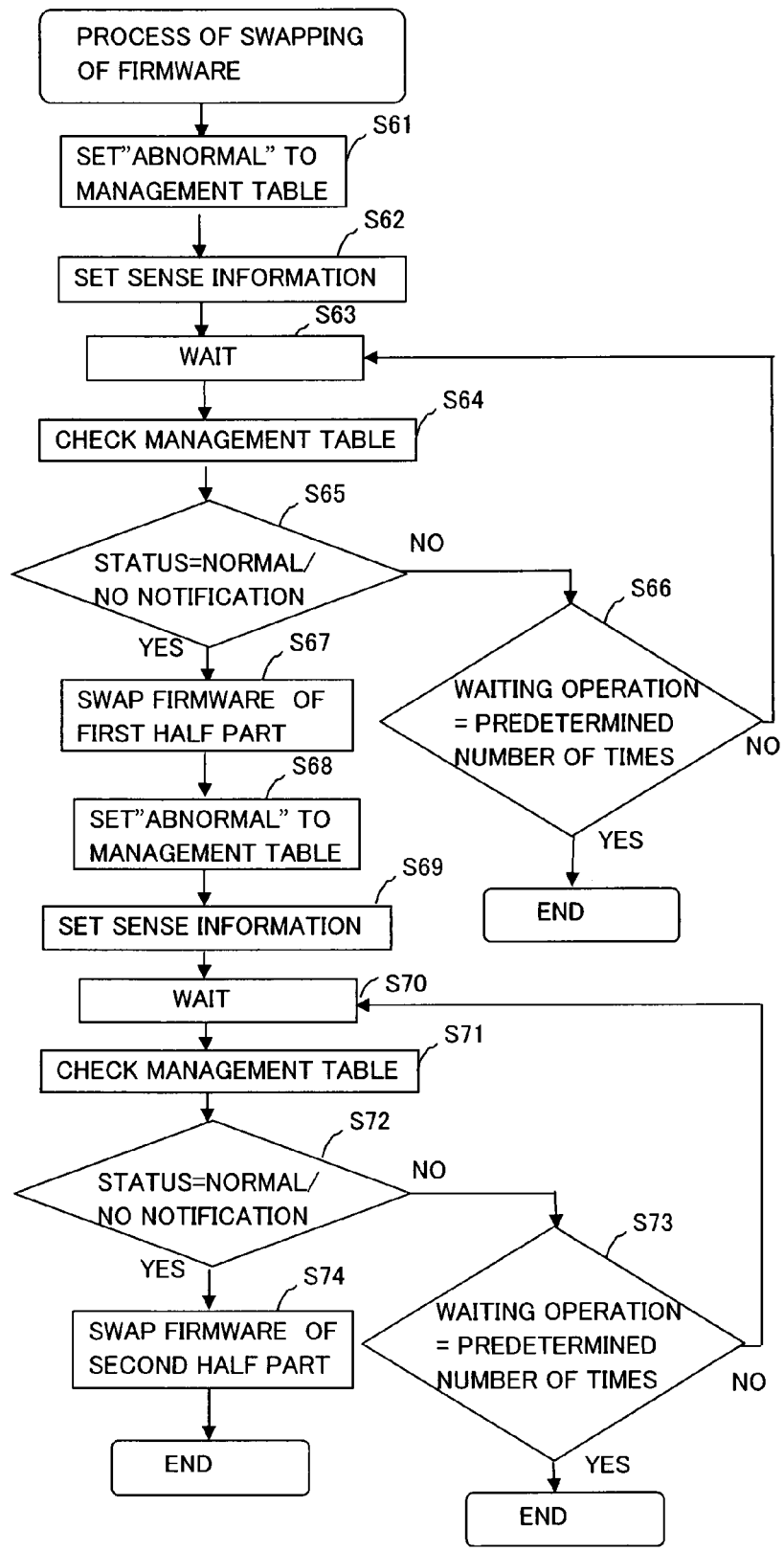
FIG. 14 is a flowchart showing a process, according to the third embodiment, of swapping of firmware.

FIG. 14 is a flowchart showing a process, according to the third embodiment, of swapping of firmware. The flowchart showing the process, according to the third embodiment, of swapping of firmware is the same as that according to the second embodiment shown in FIG. 10, except for steps of setting sense information. When a request to start swapping of firmware is received, in step S61, the status of all the paths registered in the management table 31 is first set to an abnormal status. Then, in step S62, sense information is set for the paths of host WWNs, the status information of which is not initialized. Then, in step S63, notifications of status information from the individual servers are waited for for predetermined time. When the predetermined time has elapsed, the management table 31 is referred to in step S64, and it is checked in step S65 whether the status of all the paths to the server (A) 11 and the server (B) 12 is a normal status or a no-notification status.

When the status of any one of the connection paths is abnormal, in step S66, it is determined whether a waiting operation has been performed a predetermined number of times. When a waiting operation has been performed the predetermined number of times, swapping of firmware is not performed, and the process is completed. When a waiting operation has not been performed the predetermined number of times, the process returns to step S63.

On the other hand, when the status of all the paths to the server (A) 11 and the server (B) 12 is a normal status or a no-notification status, in step S67, swapping of the firmware of the first half part is performed. When swapping of the firmware of the first half part is completed, in step S68, the status of all the paths registered in the management table 31 is set to an abnormal status. Then, in step S69, sense information is set for the paths of host WWNs, the status information of which is not initialized. Then, in step S70, notifications of status information from the individual servers are waited for for the predetermined time. After the predetermined time has elapsed, the management table 31 is referred to in step S71 and it is checked in step S72 whether the status of all the paths to the server (A) 11 and the server (B) 12 is a normal status or a no-notification status.

When the status of any one of the connection paths is abnormal, in step S73, it is determined whether a waiting operation has been performed the predetermined number of times. When a waiting operation has been performed the predetermined number of times, swapping of firmware is not performed, and the process is completed. When a waiting operation has not been performed the predetermined number of times, the process returns to step S70.

On the other hand, when the status of all the paths to the server (A) 11 and the server (B) 12 is a normal status or a no-notification status, in step S74, swapping of the firmware of the second half part is performed. When swapping of the firmware of the second half part is completed, the process is completed.

Other than the aforementioned cases, in a case where a configuration is adopted, in which, even when a path in an abnormal status exists, execution of swapping does not cause a problem for the other normal paths, swapping of firmware can be started. For example, it is assumed that a plurality of paths are provided between the server (A) 11 and the CM 3, and a plurality of paths are provided between the server (A) 11 and the CM 4. In this configuration, in a case where hot swapping of firmware of the CM 4 is first performed, when it is determined that the status of at least one of the paths connected to the CM 3 is normal even though the status of some other paths connected to the CM 3 is abnormal, it can be assumed that the paths between the server (A) 11 and the CM 3 are normal as a whole. Thus, hot swapping of firmware can be performed without stopping the service. Even when but swapping of firmware of the CM 3 is performed, similar determination can be made.

What is claimed is:

1. A storage system comprising:
    a host apparatus; and
    a storage unit that stores firmware corresponding to a plurality of connection paths connecting the host apparatus and the storage unit,
    the host apparatus including
        a status notification unit that monitors each of the connection paths and that sends status information indicating whether each of connection paths is in normal status or in abnormal status to the storage unit, and
    the storage unit including
        a communication controller that receives the status information sent from the status notification unit,
        a first control module including a first memory to store firmware, and
        a second control module including:
            a second memory to store firmware,
            a third memory,
            an input unit that accepts a request for swapping firmware and an input of update firmware, and stores the input update firmware into the third memory,
            a storage for storing a management table that stores the status information, and
            a firmware swapping control unit that updates the management table upon receiving the status information from the communication controller, determines whether all the connection paths are in the normal status based on the status information stored in the management table upon accepting the request for swapping, obtains the update firmware from the third memory and stores the obtained update firmware into the second memory when the firmware swapping control unit determines that all the connection paths are in the normal status, and stores the update firmware into the first memory when the update firmware is stored into the second memory.

2. The storage system according to claim 1, wherein the host apparatus includes means for periodically sending the information of connection paths to the storage unit, and the storage unit further includes monitoring means for detecting suspension of the notification of the status information from the host apparatus and determining that the connection paths to the host apparatus, in which the suspension has been detected, are not in the abnormal status.

3. The storage system according to claim 1, wherein the storage unit further includes access detecting means for detecting access from a host apparatus, which does not include the status notification unit, and updating means for updating the management table upon detecting the access so that connection paths to the host apparatus are in the normal status.

4. The storage system according to claim 3, wherein the access detecting means includes means for setting sense information, and sense information access detecting means for detecting that sense information has been accessed by a sense command from the host apparatus, which does not include the status notification unit.

5. A storage unit that stores pieces of firmware corresponding to a plurality of connection paths connecting a host apparatus and the storage unit, comprising:
   a communication controller that receives status information indicating whether each of the connection paths is in normal status or in abnormal status sent from the host apparatus;
   a first control module including a first memory to store firmware, and
   a second control module including:
      a second memory to store firmware,
      a third memory,
      a input unit that accepts a request for swapping firmware and an input of update firmware, and stores the input update firmware into the third memory,
      a storage for storing a management table that stores the status information, and
      a firmware swapping control unit for sequentially performing hot swapping of the pieces of firmware corresponding to the connection paths upon all the connection paths being in the normal status on the basis of the management table, upon reception of the request to perform swapping of firmware.

6. The storage unit according to claim 5, further comprising monitoring means for detecting suspension of notification of the status information from the host apparatus and determining that the connection paths to the host apparatus, in which the suspension has been detected, are not in the abnormal status.

7. The storage unit according to claim 5, further comprising access detecting means for detecting access from a host apparatus that does not include the status notification unit, and updating means for updating the management table upon detecting access so that connection paths to the host apparatus are in the normal status.

8. A method for hot swapping of firmware of a storage unit that stores firmware corresponding to a plurality of connection paths connecting a host apparatus and the storage unit, the storage unit including a communication controller and a first and second control modules, the first control module including a first memory storing firmware, the second control module including a second memory storing firmware and a third memory, the method comprising:
   receiving, by the communication controller, status information that indicates whether each of the connection paths is in normal status or in abnormal status from the host apparatus;
   storing, by the second control module, the received status information in a management table;
   accepting, by the second control module, update firmware and a request to perform swapping of firmware;
   storing, by the second control module, the update firmware into the third memory;
   determining, by the second control module, whether all the connection paths are in the normal status information based on the status information stored in the management table upon accepting the request for swapping,
   obtaining, by the second control module, the update firmware from the third memory and storing the obtained update firmware into the second memory when determined that all the connection paths are in the normal status; and
   obtaining, by the second control module, the update firmware from the third memory and storing the firmware into the first memory when the update firmware is stored in the second memory.

* * * * *